March 8, 1938.  J. M. C. SEMERY  2,110,180
DEVICE FOR CHANGING GEARS IN MOTOR CARS AND THE LIKE
Filed Dec. 14, 1935  2 Sheets-Sheet 1
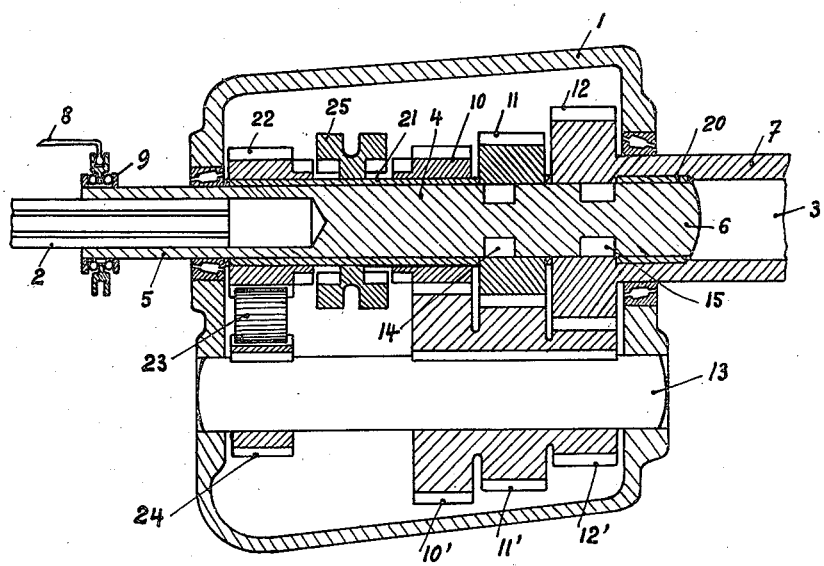
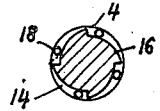 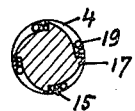
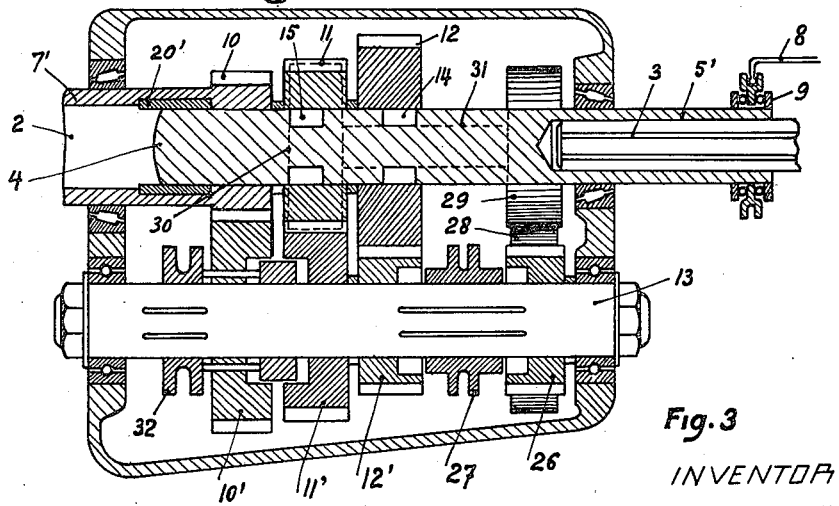
INVENTOR
JEAN MARIE CHARLES SEMERY
BY
ATTORNEY March 8, 1938. J. M. C. SEMERY 2,110,180
DEVICE FOR CHANGING GEARS IN MOTOR CARS AND THE LIKE
Filed Dec. 14, 1935 2 Sheets-Sheet 2

INVENTOR
JEAN MARIE CHARLES SEMERY
BY
ATTORNEY

Patented Mar. 8, 1938

2,110,180

UNITED STATES PATENT OFFICE 2,110,180

DEVICE FOR CHANGING GEARS IN MOTOR-CARS AND THE LIKE

Jean Marie Charles Semery, Paris, France

Application December 14, 1935, Serial No. 54,379
In France December 18, 1934

2 Claims. (Cl. 74—363)

The present invention relates to an improvement to the devices for changing gears in motor cars and the like, of the type described in the U. S. A. Patent No. 2,013,586. The device described in said patent comprises a casing into which penetrate the driving and the driven shafts, in this casing a series of pinions of increasing diameter comprising hollow hubs and mounted concentrically to one of the two shafts (the driving or the driven shaft), in a manner to rotate freely in the casing with respect to said shaft, these pinions constantly meshing with a series of pinions of decreasing diameter integral with the second shaft (or with an intermediate shaft), whilst a locking device constituted for instance by a free wheel drum provided with eccentered slopes and with balls or rollers is disposed in a manner to slide on that driving or driven shaft, on which are freely mounted the pinions with the hollow hubs, this drum being in contact with the inner surface of the hub of these pinions and its inclined slopes being disposed in a manner that locking shall occur as soon as the speed of the shaft becomes greater than that of the pinion in front of which the drum lies; a second free wheel drum, identical to the first, is integral in axial movement with the latter and comprises eccentered slopes disposed in the opposite direction in a manner to produce locking when the shaft rotates at a speed lower than that of the pinion with which said drum is in contact.

The improved device according to the present invention is characterized by the fact that the pinions capable of rotating freely with respect to the driving or the driven shaft are mounted freely on an auxiliary shaft capable of moving axially in the casing of the gear box, this shaft being rendered integral in rotation only with one of the driving or the driven shafts and comprising one or more circular grooves in which are located the locking members.

The provision of circular grooves on the auxiliary slidable shaft, in which the locking members of said free wheel drums are located without projecting on the surface of said shaft, permits to avoid the use of pinions provided with hollow hubs and supported by ball bearings integral with the casing of the gear box, and to replace them by ordinary pinions mounted freely directly on the auxiliary shaft, so that the construction is simplified and its price lowered.

By way of example, two forms of realization of the device according to the invention have been described below and represented on the annexed drawings.

Figure 1 represents in sectional elevation a first embodiment of the device.

Figures 2a and 2b represent in transverse section the locking members.

Figures 3, 4 and 5 represent respectively in axial section, in plan view and in end elevation a second form of realization.

Figure 4:
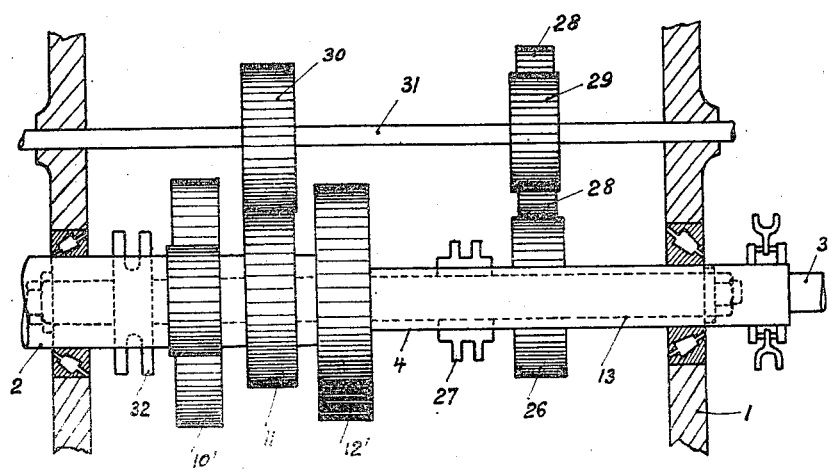

The device represented in Figure 1 comprises a casing 1 into which penetrate the driving and the driven shafts, 2 and 3, alined the one with the other. Inside the casing 1 is an auxiliary shaft 4, one end 5 of which, formed as a socket, is connected by slidable keying means to the driving shaft 2, and the other end 6 of which rotates freely inside the socket 7 forming the end of the driven shaft 3. A bar 8 controls by means of ball thrust bearings 9, the axial displacements of the auxiliary shaft 4. On this shaft are freely mounted the pinions 10, 11, 12 of increasing diameter, the last of which, 12, is integral with the driven shaft, whilst on an intermediate shaft 13 are keyed the pinions 10', 11', 12' of decreasing diameter, constantly in mesh with the first. On the auxiliary shaft 4 are provided two circular grooves 14, 15 spaced at a distance greater than the length of one of the pinions 10, 11, 12, the bottom of the grooves being provided with eccentered slopes 16 and 17 (Figure 2) provided with rollers 18, 19, the slopes 16 of the groove 14 being disposed in a manner to produce the locking when the shaft 4 rotates more rapidly than that one of the pinions 10, 11, 12 with which the rollers 18 are in contact, whilst the slopes 17 of the groove 15 are disposed in the opposite direction in a manner to produce the locking when the shaft 4 rotates less rapidly than the pinion with which the rollers 19 of this groove 15 are in contact, this arrangement permitting, as has been indicated in the previous abovementioned patent of the same inventor, to obtain the braking of the vehicle by the engine although there is provided a free wheel transmission with automatic clutch. Under direct drive conditions, the driving groove 14 is brought in front of the pinion 12 integral with the driven shaft 3, whilst the braking groove 15 engages the socket 20 rotating freely in the socket 7 forming the end of the shaft 3.

Reverse gear and neutral are obtained in the following manner: The first speed pinion 10 is mounted freely on a socket 21 on which is also mounted freely a pinion 22 driving the intermediate shaft 13 through the means of pinions 23, 24 in a manner to cause the shaft 13 to rotate in the opposite direction to that in which it rotates normally. The socket 21 is mounted freely on the auxiliary shaft 4 and may be rendered integral with this shaft by the driving groove 14, whilst each of the pinions 10 and 22 may be rendered integral with the socket 21 by means of a dog clutch 25. The keying of the socket 21 of the pinion 10 gives forward drive, and that of the pinion 22, reverse drive, whilst when in intermediate position, the dog clutch 25 gives neutral. If the driving shaft 2 rotates at a speed lower than that of the pinion with which the locking device 14—16—18 was rendered integral, the rollers 18 of said device will be freed, whilst, on the contrary, as soon as the speed of the shaft 2 will become lower than that of the pinion inside which rotates the locking device 15—17—19, the locking will take place in said latter device, so that the driven shaft 3 will be automatically braked by the driving shaft in the same manner as in the case of a usual gear box without free wheel transmission.

Figure 5:
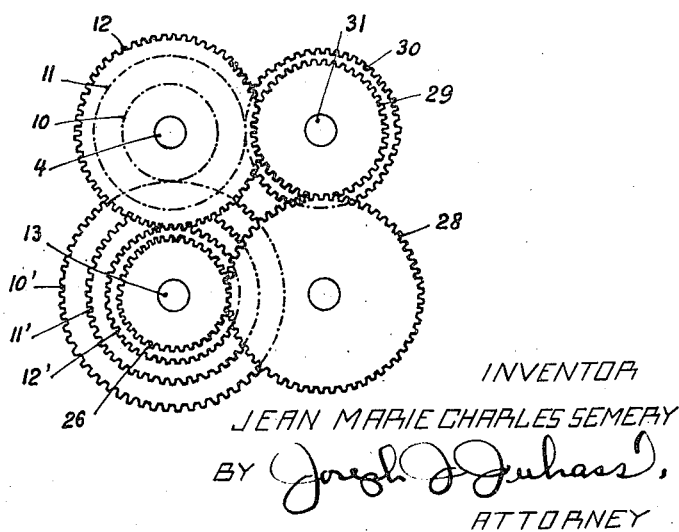

Figures 3, 4 and 5 represent another embodiment of the gear mechanism according to the invention, in which the auxiliary shaft 4, on which are freely mounted the pinions 10, 11, 12, is rendered integral in rotation with the driven shaft 3 by means of the socket 5', whilst the pinion 10 is this time integral with the driving shaft 2 which is ended by a socket 7'. Under these conditions, direct drive will take place when the free wheel driving groove comes to lie opposite the pinion 10, whilst the pinion 12 corresponds to first gear. For the same reason, the driving groove 14 lies, contrarily to the device according to Figure 1, nearer to the driven shaft than the braking groove 15, and the freely mounted socket 20', into which engages the braking free wheel 15 under direct drive conditions, is located inside the driving shaft 2.

In this form of realization of the invention, reverse gear is obtained by means of an additional pinion 26 mounted freely on the intermediate shaft 13 and capable of being rendered integral with the latter by means of a dog clutch 27. The pinion 26 is connected to one of the pinions mounted on the auxiliary shaft, for instance to the pinion 11, by means of a train of gears adapted in a manner that the pinion 26 shall transmit to the pinion 11 a rotation in the same direction as its own, and therefore in the opposite direction to the normal rotation of pinion 11. This gearing may for instance consist in the pinion 28 meshing with pinion 26, and the pinions 29 and 30 carried by the shaft 31 and meshing respectively with the pinions 28 and 11. In order to enable pinion 11 to be driven in the opposite direction to the normal, the pinion 11' of the intermediate shaft 13, which is in mesh with the pinion 11, may be set free on this shaft by means of a dog clutch 32. The pinion 11, rotating in the opposite direction to the normal, will be locked on the auxiliary shaft 4 by means of the braking groove 15 which plays, in the case of reverse drive, the part of the driving groove, thus permitting the drive of shaft 4 and therefore of the driven shaft 3 in the opposite direction, corresponding to reverse. If reverse drive is desired, pinion 11' is rendered free by displacing the dog clutch 32 to the left, whilst pinion 26 is rendered integral with the shaft 13 by displacing the dog clutch 27 to the right. The shaft 13 will be driven from the driving shaft 2 through pinions 10, 10', the first of which is integral with shaft 2; the rotation of shaft 13 is transmitted through pinions 26, 28, 29 to the shaft 31 and then through pinion 30 to the pinion 11, which in his turn drives the auxiliary shaft 4 by means of the locking device 15 as explained above. The driven shaft 3 will be consequently rotated in the reversed direction. For obtaining neutral, the intermediate pinion 12" is mounted freely on the shaft 13 and may be rendered integral with the later, for front drive, by moving the dog clutch 27 to the left.

I claim:—

1. A device for changing gears for motor cars and the like, comprising a casing, a driving and a driven shaft disposed aligned one with the other, an auxiliary shaft disposed between the two first in a manner capable to be displaced axially in said casing, means for rendering said auxiliary shaft integral in rotation only with one of the two first said shafts, an intermediate shaft parallel with the preceding shafts and rotatably mounted in the casing, a series of pinions of increasing diameter mounted freely on said auxiliary shaft and continuously supported by the latter in its every position, one pinion of said series of pinions being integral with one of the two first said shafts, another series of pinions of decreasing diameter meshing with the first series and fixed to said intermediate shaft, on the external surface of said auxiliary shaft two circular grooves, in the bottom of said grooves eccentered slopes and rollers resting on said slopes without projecting beyond the external surface of said auxiliary shaft, the slopes of said two grooves being inclined respectively in opposite directions in order that one of them produces locking when the auxiliary shaft rotates more rapidly than the pinion opposite which said groove lies, whilst the second groove produces the locking when the auxiliary shaft rotates less rapidly than the pinion opposite which lies said second groove.

2. A device for changing gears for motor cars and the like, comprising a casing, a driving and a driven shaft disposed alined one with the other, an auxiliary shaft disposed between the two first in a manner capable to be displaced axially in the casing and rendered integral in rotation only with the driven shaft, a series of pinions of increasing diameter mounted freely on said auxiliary shaft and the first of which is integral with the driving shaft, an intermediate shaft parallel with the preceding shafts and rotatably mounted in the casing, a series of pinions of decreasing diameter integral with this intermediate shaft and constantly meshing with the pinions mounted freely on the auxiliary shaft, on this auxiliary shaft two circular grooves at a distance apart greater than the width of a pinion, in the bottom of said grooves eccentered slopes and rollers resting on these slopes, the slopes of said two grooves being inclined respectively in opposite directions, means for controlling the axial displacements of the auxiliary shaft, an additional pinion for reverse gear mounted freely on the intermediate shaft, means for rendering integral this pinion with said shaft, means for transmitting the rotation of this pinion to one of the pinions mounted freely on the auxiliary shaft in a manner that both said pinions rotate in the same direction, means for rendering free, on said intermediate shaft the pinion in mesh with the above said pinion of the auxiliary shaft.

JEAN MARIE CHARLES SEMERY.